No. 722,210. PATENTED MAR. 10, 1903.
J. J. CONNORS.
SOFT PIE FILLER.
APPLICATION FILED NOV. 24, 1902.
NO MODEL.
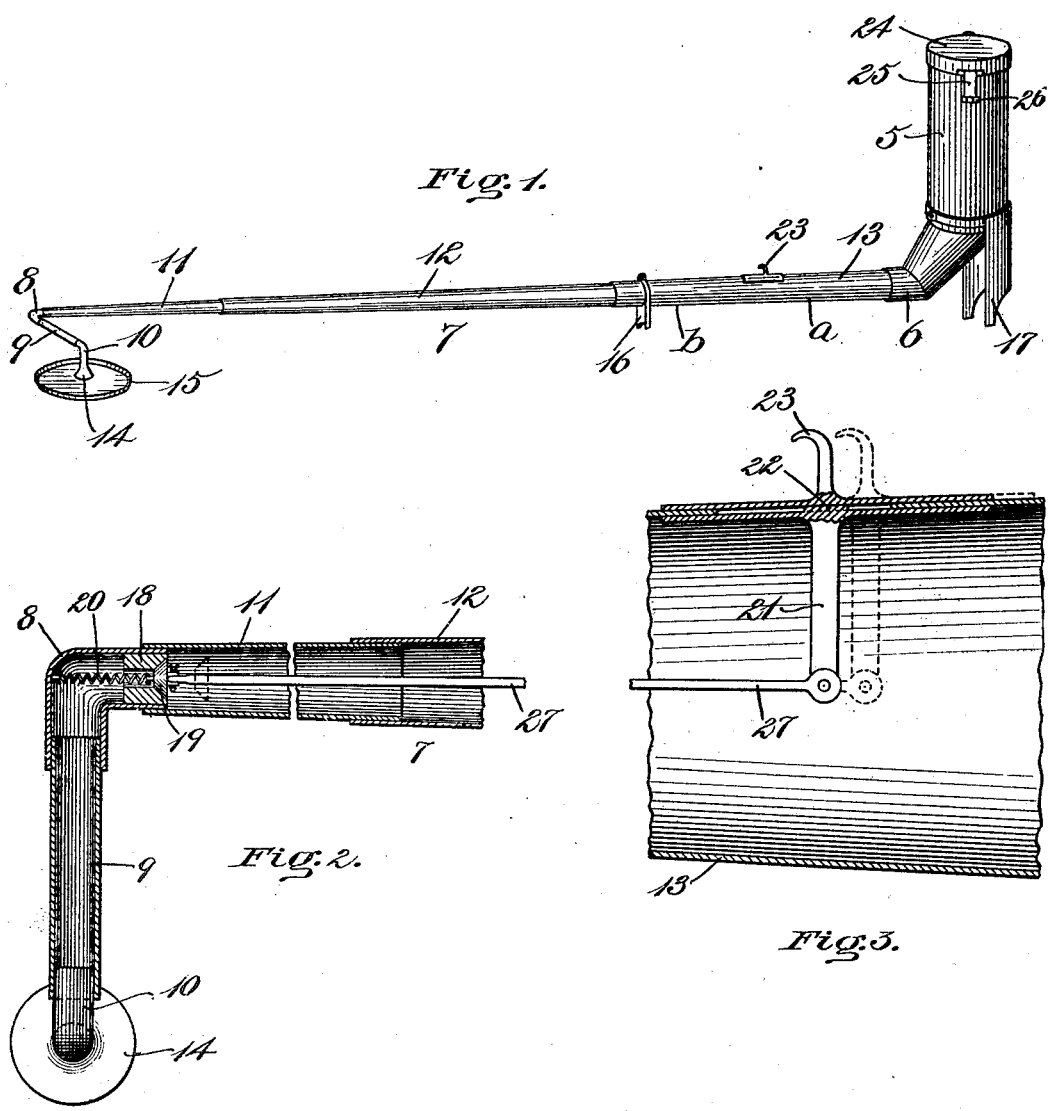
Witnesses.
Franklin E. Low
Sydney E. Taft
Inventor.
Jerome J. Connors
by his Attorney,
Charles N. Gooding.

UNITED STATES PATENT OFFICE.

JEROME J. CONNORS, OF MARLBORO, MASSACHUSETTS.

SOFT-PIE FILLER.

SPECIFICATION forming part of Letters Patent No. 722,210, dated March 10, 1903.

Application filed November 24, 1902. Serial No. 132,558. (No model.)

*To all whom it may concern:*

Be it known that I, JEROME J. CONNORS, a citizen of the United States, residing at Marlboro, in the county of Middlesex and State of Massachusetts, have invented new and useful Improvements in Soft-Pie Fillers, of which the following is a specification.

This invention relates to a device for filling the crust of pies with soft material, such as squash and the like.

The device is particularly adapted for filling a large number of pies in the ordinary bakers' ovens. These ovens vary in size from eight to twelve feet in width and depth, and the custom is to fill the pies from a ladle containing the material for the filling. The pies are arranged in parallel rows from front to rear of the oven, with a space between the rows of sufficient width to allow the ladle to rest upon the bottom of the oven and to be pushed by means of a long handle between two of said parallel rows of pies, and the pie-crust formed and held in a plate or pan adapted therefor is filled from said ladle. It will be seen that this space is necessary, as the weight of the material in the ladle is considerable and the distance from the back to the front of the oven is often from eight to ten feet. It is very essential that the material should be poured into the pie-crust as soon after the crust is placed in the oven as possible. Otherwise said crust will blister from the heat of the oven, and this is undesirable. It will therefore be seen that the baker has to work very quickly in order to get the pies filled with the mixture before the crust blisters, and in the haste of this manner of filling the pies a certain amount of material is often spilled upon the bottom of the oven and also is spilled over the edge or rim of the pie, and as the baking continues this causes the edge of the pie to become scorched and blackened.

The object of this invention is to provide a device which may be adapted to different sizes of ovens and which will save waste of material and time, will prevent the oven from becoming soiled, will save the waste space between the rows of pies now used to form a pathway for the ladle, as hereinbefore described, and, finally, will prevent the mixture from being spilled not only upon the bottom of the oven, but over the edge or rim of the pie, with the undesirable results hereinbefore set forth.

To this end my invention consists in a device for filling pie-crust with a soft mixture comprising a receptacle, a nozzle, a feed-pipe connecting said receptacle and nozzle, and a valve located between said nozzle and receptacle.

The invention further consists in the instrumentalities hereinbefore set forth in combination with means to operate said valve.

The invention finally consists in the specific details of construction hereinafter described in the specification and particularly pointed out in the claims thereof.

Referring to the drawings, Figure 1 is a perspective view of my improved soft-pie filler in position to fill a pie-crust. Fig. 2 is an enlarged detail horizontal section of the forward end of the device, the valve being shown closed in full lines and open in dotted lines. Fig. 3 is an enlarged vertical longitudinal section of the portion of the feed-pipe containing the means for operating the valve, the handle by which the valve is operated being shown in full lines when the valve is closed and in dotted lines when the valve is open.

Like numerals refer to like parts throughout the several views of the drawings.

In the drawings, 5 is a receptacle, preferably cylindrical in form, in which the soft filling for the pies is placed. Said receptacle terminates at the bottom thereof in an elbow 6 and is connected by a feed-pipe 7, elbow 8, and horizontal lateral extension 9 to a downwardly-projecting nozzle 10. It will be noted that said horizontal extension 9 extends laterally at substantially right angles from the feed-pipe 7 at the outer end thereof, the object of this lateral extension being that the receptacle 5 may not interfere with the operator's view of the nozzle 10. The feed-pipe 7 is preferably formed in sections 11, 12, and 13, and these sections may be of different lengths to suit varying sizes of ovens and are detachably connected one to the other, the section 13 being detachably connected to the elbow 6 and the section 11 to the elbow 8. The nozzle 10 is provided with a flaring mouth or outlet 14 in order that the filling as it is discharged from said nozzle may flow outwardly and downwardly therefrom into the space 15, inclosed by the pie-crust, without too much force.

In order to prevent the receptacle 5 from falling over when not in use, standards 16 and 17 are provided, the standard 16 being clamped to the section 13 of the feed-pipe 7 and the standard 17 being clamped to the lower portion of the receptacle 5.

In the forward end of the feed-pipe 7 is provided a valve-seat 18 and valve 19. The valve 19 is held against the seat 18 by a spiral tension-spring 20, one end thereof fast to said valve and the other to the elbow 8. The valve 19 is connected by a link 27 in the interior of the feed-pipe 7 to an arm 21, extending downwardly from a slide 22, arranged to slide lengthwise of the feed-pipe 7 and provided with a handle 23, by means of which it may be moved lengthwise of said feed-pipe to open the valve 19 and allow the liquid from the receptacle and from the feed-pipe 7 to flow past said valve through the elbow 8, lateral extension 9, and nozzle 10 into the space inclosed by the pie-crust 15.

The receptacle 5 is provided with a cover 24, hinged to a link 25, which in turn is hinged at 26 to said receptacle, thus forming a convenient means whereby the cover 24 may form a tight joint with the upper end of the receptacle 5.

In using my improved soft-pie filler the receptacle 5 is held between the arm and side of the operator. One hand is placed beneath the feed-pipe 7 at about the point $a$. The other hand is used to assist in holding and guiding the feed-pipe 7 and is placed at about the point $b$, Fig. 1. The hand at $a$ may be used to manipulate the slide 22 and open the valve 19 by drawing said slide toward the feed-receptacle by means of the handle 23. The operater moves the nozzle 14 over each of the pie-crusts in turn, opening the valve, as hereinbefore described, and allowing the material to flow from the receptacle 5 through the feed-pipe 7 and nozzle 14 into the space surrounded by the pie-crust 15. As soon as the pie is sufficiently filled the operator releases the handle 23, and the valve 19 closing prevents any further supply of material from flowing through the nozzle 14. Said nozzle is then carried from the pie which has just been filled to the next pie adjoining and the operation repeated.

It will be seen and understood that the principal weight of material is contained in the receptacle 5 and that the portion held in the feed-pipe at the outer end is very light and easily managed by the operator, which is just the reverse condition of affairs from that in which the ladle is used, as hereinbefore described, where the whole weight of the material is in the ladle at the end of a long handle and is very heavy and difficult to manage.

The advantages secured by my improved device are the saving of material and time, saving of space in the oven, preventing the oven from being soiled and the material from spilling over the edge of the pie, with the results hereinbefore set forth, and, further, by the use of my improved device a very much larger number of pies can be baked in the same time with less labor and in a smaller oven than with the use of the ladle hereinbefore described.

It will be noted that while I have illustrated and described my improved device as particularly adapted for use in bakers' ovens of large size the same may be constructed of a much smaller size to be used in connection with ordinary household-ranges.

It will be seen and understood that the horizontal lateral extension 9, together with the nozzle 10, is arranged in the drawings at the left of the feed-pipe 7 as viewed from the end of said feed-pipe to which the receptacle 5 is attached; but when it is desired to fill pies at the extreme right-hand side of the oven as the operator faces said oven it is evident that the lateral extension 9 and nozzle 10 must be arranged to project toward the right from said feed-pipe 7. In order to accomplish this result, the horizontal extension 9 and nozzle 10 are rotated through an angle of one hundred and eighty degrees from the position shown in the drawings by turning the elbow 8 in the section 11 through said angle and rotating the nozzle 10 about the median center line of the horizontal lateral extension 9, so that said nozzle may project downwardly in the new position of the horizontal lateral extension 9, hereinbefore referred. It will now be seen that the operator can fill pies which are located against the right-hand wall of the oven without any other change in the apparatus.

Having thus described my invention, what I claim, and desire by Letters Patent to secure, is—

1. A device of the character described, comprising a vertical receptacle, a downwardly-projecting nozzle, a horizontal feed-pipe connected at one end thereof to said receptacle, and a horizontal pipe extension fast to the other end of said feed-pipe and extending laterally therefrom to said downwardly-projecting nozzle.

2. A device of the character described, comprising a vertical receptacle, a nozzle, a horizontal feed-pipe connecting said receptacle and nozzle, a spring-controlled valve adjacent to said nozzle, a slide adjacent to said receptacle and arranged to slide longitudinally upon the exterior of said horizontal feed-pipe, and a link connecting said valve and slide.

3. A device of the character described, comprising a vertical receptacle, a downwardly-projecting nozzle, a horizontal feed-pipe formed in sections detachably connected to said receptacle, a horizontal reversible pipe extension extending laterally from said feed-pipe, and elbows detachably connecting said horizontal pipe extension to said feed-pipe and nozzle.

In testimony whereof I have hereunto set my hand in presence of two subscribing witnesses.

JEROME J. CONNORS.

Witnesses:
  CHARLES S. GOODING,
  EMMA L. CHASE.